UNITED STATES PATENT OFFICE.

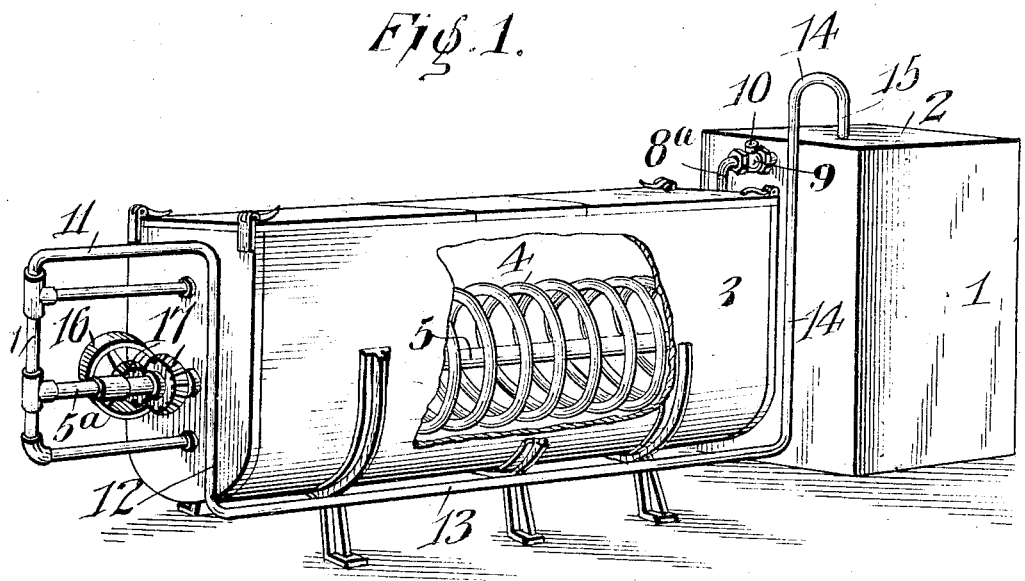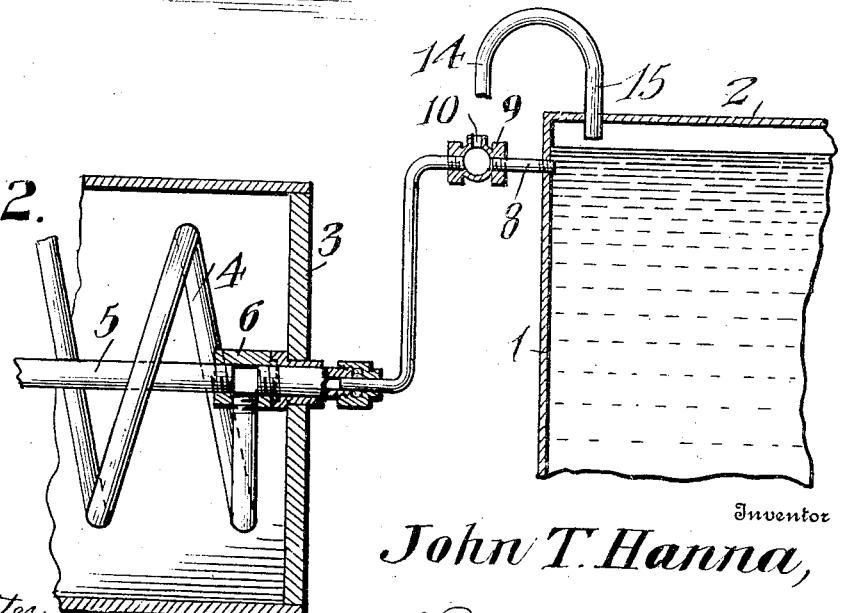

JOHN T. HANNA, OF LONEROCK, IOWA.

CREAM-RIPENER AND LIKE MACHINE.

No. 910,675.     Specification of Letters Patent.     Patented Jan. 26, 1909.

Application filed August 25, 1908. Serial No. 450,185

*To all whom it may concern:*

Be it known that I, JOHN T. HANNA, a citizen of the United States, residing at Lonerock, in the county of Kossuth and State of Iowa, have invented certain new and useful Improvements in Cream-Ripeners and Like Machines, of which the following is a specification, reference being had therein to the accompanying drawing.

This invention relates to peculiar means for facilitating the circulation of liquid, preferably, through a liquid or cream ripener and cooler, and has for its object the provision of means for increasing the rapidity of the passage of cooling liquid through the coils of a cream ripener, and the returning of the cooling liquid to a reservoir or tank, and subsequently, again, passing the same through the coils.

Another object of the invention is to provide an apparatus of this character, by means of which the liquid can be cooled prior to discharging the same into the reservoir or tank, and also facilitating the passage of the liquid through the ripener or cream receptacle by the admission of air into the outlet or outflow pipe.

A further object of the invention is the peculiar construction of an attachment for cream ripeners, which comprises a minimum number of parts, is efficient and durable in operation, and which is comparatively inexpensive to construct and maintain in operation.

With these and other objects in view, the invention consists of certain novel constructions, combinations, and arrangements of parts, as will be hereinafter fully described and claimed.

In the drawings: Figure 1 is a perspective view, partly shown in section, of an apparatus embodying the present invention. Fig. 2 is an enlarged, fragmentary, sectional view of my attachment.

Referring to the drawing 1 designates a reservoir or tank, which is, preferably, closed by any suitable top 2, and said reservoir is placed contiguous to one end of the body 3 of the cream retainer or cooler. Within the body is positioned a coil pipe 4, which pipe terminates at both ends in a horizontal, central portion 5, the inner end of the central portion 5 being journaled in coupling-device 6, Fig. 2, while the outer end $5^a$ is in communication with a vertical pipe 7.

An outlet 8 extends through the side of the reservoir or tank 1, and positioned upon the upper portion of this outlet pipe is an air-cock or valve 9, which cock or inlet is provided with an opening 10, thereby permitting air to enter the outlet pipe 8. The outlet-pipe 8 extends down, at $8^a$, and into the coupling-device 6.

The liquid, or any other suitable cooling means, is passed from the tank 1 through the valved outlet-pipe 8 down to the inner end of the coil or circulating pipe and through the circulatory movement of the liquid, said liquid is thereby forced toward and out of the other end of the coil through portion $5^a$ into the vertical pipe 7, and thence along through a horizontal portion 11, and thence down through portion 12 to a horizontal portion 13, which horizontal portion 13 is positioned contiguous to the floor. The portion 13 cools the liquid, as it passes back to the tank or reservoir 1, for it is well known that, as a rule, the air is coldest in a room or building near the floor, and, furthermore, the placing of the pipe-portion 13 under the body 3, contiguous to the floor, also moves it out of the way of the operator, and as the portion 13 terminates in a vertical portion 14, contiguous to or between the contiguous faces of the body 3 and the tank or reservoir 1, it would seem that the return, vertical portion 14 is also placed out of the way. The vertical portion 14 terminates in a discharge end or spout 15, which opens at its inner end into the tank or receptacle 1.

I have found, from practical experience, that by reason of my peculiar attachment, in which air is admitted to out-flowing liquid, the capacity of the cooler or ripener for treating cream is increased substantially one-third, owing to the coldness of the liquid passing through the portions 4 and 5 of the cooling member in the body 3, and the rapidity with which the liquid is passed from the reservoir through the body of the ripener and returned to said reservoir.

The form of the coil and the coupling device for connecting the outlet pipe therewith, is very effective for transmitting cold to the liquid contained in the receptacle.

It is to be understood that while my invention is particularly adapted to a cream ripener, still it may be used for other purposes in which my peculiarly-constructed device is susceptible of being operated under the same condition, and when used in conjunction with or as the important part of a circulating system in a cream ripener or cooler apparatus. It will also be understood that the liquid, as for instance, water, will be continuously circulated through the ripener pipes and the reservoir or tank when the coil is rotated through the medium of the belt-wheel 16 and gears 17, and that the flow of liquid through the coöperating parts of the apparatus will be very rapid, which insures of the cream being subjected to the greatest possible amount of cooling medium in a minimum amount of time, owing to the cold liquid passing therethrough.

What I claim is:

1. In an apparatus of the class described, the combination with a reservoir and a receptacle contiguous to said reservoir, a rotatable pipe within said receptacle, of an outlet pipe provided with an air inlet communicating at one end with the interior of the reservoir and at its other end directly with the rotatable pipe at one of its ends, a return pipe positioned outside of said receptacle and near the bottom thereof, said return pipe opening at one end into the top of said reservoir, and means connecting the other end of said return pipe to the rotatable pipe.

2. In an apparatus of the class described, the combination with a reservoir and a receptacle contiguous to said reservoir, of a circulating conduit rotatably mounted in said reservoir, means provided with an air-inlet, forming communication with the reservoir and the conduit at one end, and means placing said conduit at its other end in communication with the reservoir, said last-mentioned means being positioned outside of and near the bottom of the receptacle.

3. In an apparatus of the class described, the combination with a reservoir and receptacle, of a rotatable coil mounted in said receptacle, an outlet pipe or tubing provided with an air-inlet entering the side of said reservoir and extending through the end of said receptacle and communicating near one end with the inner end of said coil, and a return pipe communicating with the opposite end of said coil and having a portion extending under the receptacle and positioned near the contiguous faces of said reservoir and receptacle and extending through the top of said reservoir.

4. In an apparatus of the class described, the combination with a reservoir and a receptacle, of a coil rotatably mounted in said receptacle, a horizontal outlet pipe provided with an air-cock extending at one end through the sides of said reservoir and having a depending portion through the top of said receptacle, the lower end of said depending portion communicating with the inner end of said coil, said coil provided with an end extending through one end of the receptacle, and said extended end terminating in a vertical pipe, said vertical pipe terminating in a horizontal portion, and the horizontal portion terminating at its inner end in a vertical portion, said vertical portion terminating at its lower end in a horizontal portion extending under the receptacle and said last-mentioned horizontal portion terminating in a vertical portion having a discharge portion extending through the top of the reservoir.

5. In an apparatus of the class described, the combination with a reservoir and a receptacle spaced from but located contiguous to said reservoir, a rotatable pipe within said receptacle, of a conduit provided with an air-inlet intermediate its length, interposed between the reservoir, and one end of the conduit entering the side of the reservoir and having its other end communicating with the contiguous end of the rotatable pipe, and a return-pipe communicating at one end with the other end of the rotatable pipe, and the other end of the return pipe extending into the reservoir through the top thereof, whereby an automatic flow of liquid is obtained through the conduit, rotatable pipe, and return pipe and reservoir.

In testimony whereof I hereunto affix my signature in presence of two witnesses.

JOHN T. HANN

Witnesses:
J. W. SULLIVAN,
CARRIE STALEY